H. VATTER, Jr.
MOTOR BEARING BURNING-IN STAND.
APPLICATION FILED OCT. 17, 1919.
1,386,035.
Patented Aug. 2, 1921.
3 SHEETS—SHEET 3.
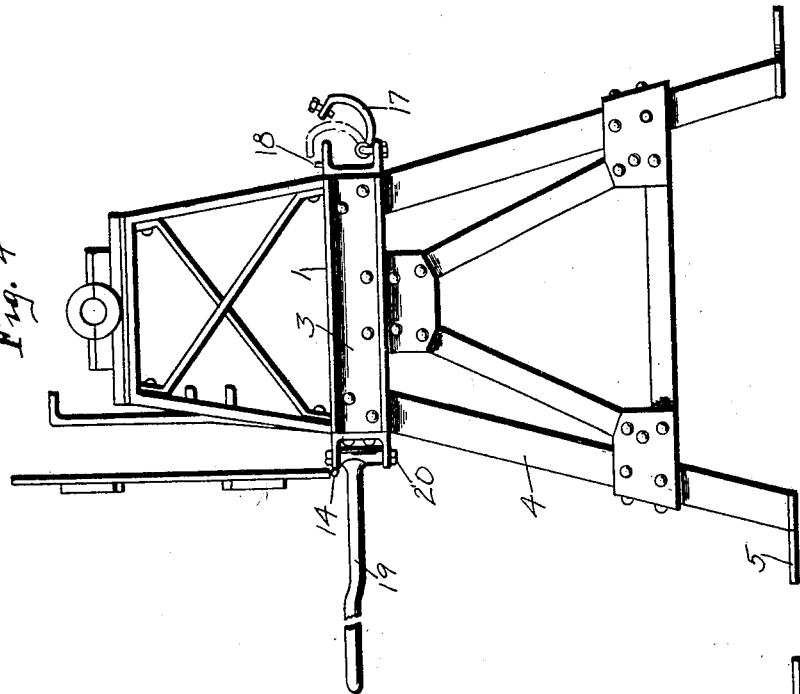
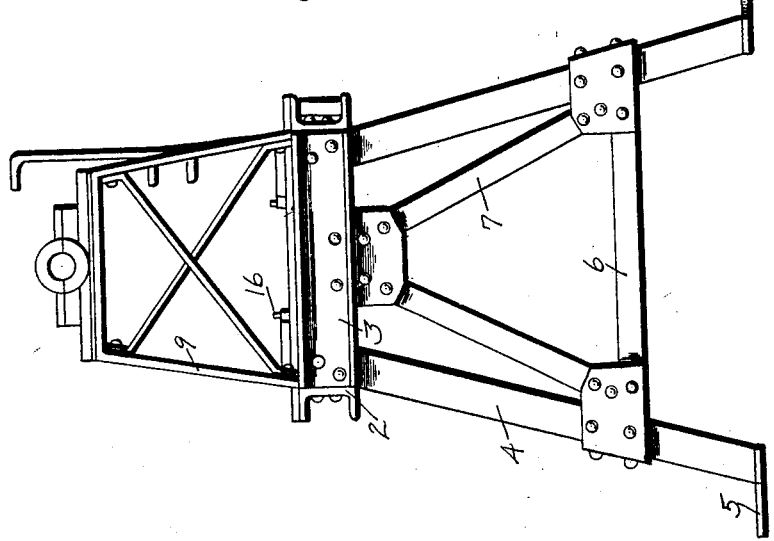
WITNESSES
INVENTOR
H. VATTER, Jr.
BY
ATTORNEYS

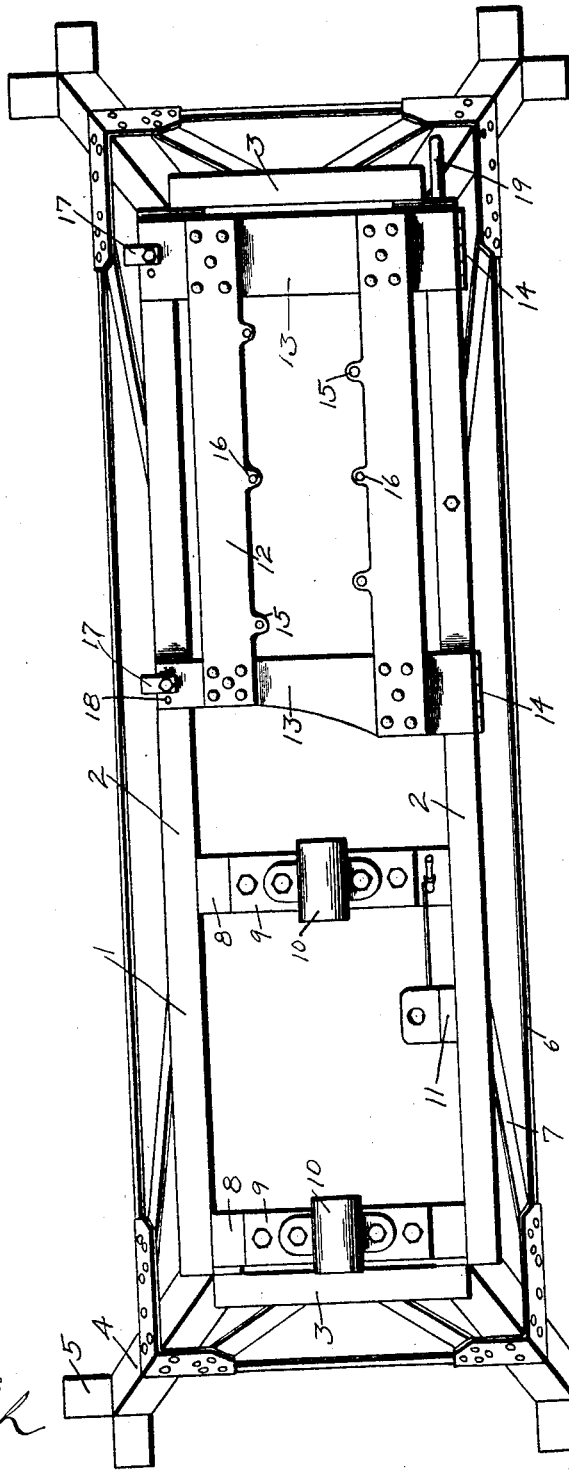

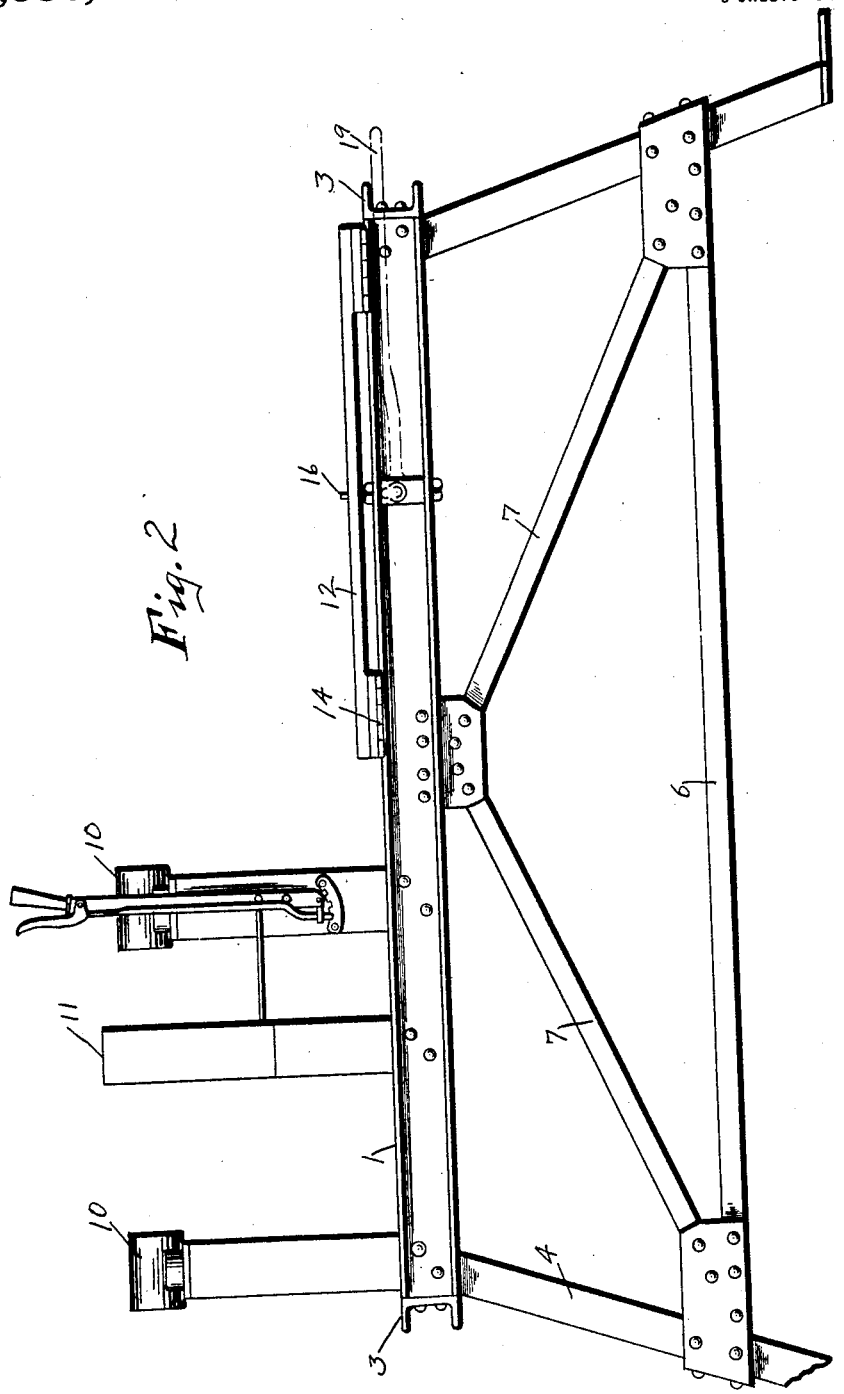

UNITED STATES PATENT OFFICE.

HENRY VATTER, JR., OF SHREVEPORT, LOUISIANA.

MOTOR-BEARING-BURNING-IN STAND.

1,386,035.  Specification of Letters Patent.  Patented Aug. 2, 1921.

Application filed October 17, 1919.  Serial No. 331,407.

*To all whom it may concern:*

Be it known that I, HENRY VATTER, Jr., a citizen of the United States, and a resident of Shreveport, in the county of Caddo and State of Louisiana, have invented new and useful Improvements in Motor - Bearing-Burning-In Stands, of which the following is a specification.

This invention relates to an improved motor bearing burning in stand, one of the principal objects thereof being to provide a stand of the nature set forth, having improved means consisting of a hinged table, for securing the cylinder block in place on the stand in such manner that the cylinder block is made accessible for inspection, assembling, removal, adjusting or fitting of parts, without removing the block from the machine.

Another object of the invention resides in the provision of means for fixedly holding the table relatively to the stand in normal position for burning in the bearings, and further providing means for supporting the weight of the cylinder block when the table is raised.

Another object of the invention is to provide a device of the class described which will be relatively simple, durable, efficient in operation, and inexpensive to manufacture.

With these and other objects in view which will become apparent as the description proceeds, the invention resides in the construction, combination and arrangement of parts hereinafter more fully described and claimed, and illustrated in the accompanying drawings in which like characters of reference indicate like parts throughout the several figures, in which:—

Figure 1 represents a top plan view of a stand constructed according to my invention, Fig. 2 represents a side elevation thereof, Fig. 3 represents an end elevational view of the stand, and Fig. 4 represents an end elevational view of the stand showing the opposite end of that shown in Fig. 3.

Referring more particularly to the drawings, the stand includes a rectangular base 1 made of channel iron, the members of which are suitably riveted, bolted, or otherwise secured together, such base comprising side rails 2 and end transoms 3. The base is supported at the corners upon legs 4, having base flanges 5 whereby the stand may be fixedly secured to the floor. The base and legs are suitably braced by means of horizontal and inclined members 6 and 7 respectively, riveted or bolted to angle irons mounted on the legs and base.

At one end of the base 1 and at a suitable distance from each other are arranged transoms 8 upon which the bearing supports 9 are mounted. These supports carry bearings 10 in which a pulley driven and clutch controlled power shaft, not shown, is journaled. This shaft, as in other devices of the same nature, is for the purpose of driving the crank shaft of the cylinder block for burning or running in the crank shaft bearings. The power shaft may be connected with the crank shaft of the cylinder block by means of a clutch coupling, not shown. A clutch control support 11 is mounted on one of the rails 2 between the transoms 8, as shown in the drawings.

At the opposite end of the base 1, is mounted a table on which the cylinder block is adapted to be supported. This table is in the shape of a frame including longitudinal side members 12 and lateral end members 13, riveted and welded together, or otherwise connected, the end members 13 being hinged as at 14, to one of the rails 2 of the base, whereby the table may be swung in the arc of a circle, relatively to the base 1, upon the hinges 14. The side members 12 of the table are provided at their inner edges with ears 15 having openings through which cap screws may be passed to engage in threaded openings in the cylinder block for securing the latter in position on the table. Dowel pins 16 carried by the side members 12 of the table, facilitate the alinement of the cylinder block on the table so that the cap screws readily enter their places in the block. When the screws are tightened, the block is held rigidly and in its proper position upon the table, so that the crank shaft will be in alinement with the clutch coupling.

In order that the table may be fixed in a horizontal position upon the base 1, when the bearings are to be burned in, a pair of hinged screw clamps 17, mounted upon one of the rails 2, are provided. These clamps may be engaged over the ends of the members 13 of the table, and the screws tightened down for securing these members against the base. Dowell pins 18, mounted on the rail adjacent the clamps 17, engage openings in the ends of the members 13 of the table for properly alining the same, and for assisting in preventing vibration of the table relatively to the base when the crank shaft is put under power.

A swinging support or arm 19, is mounted on a vertical hinge 20 between the flanges of the rail 2, upon which the table is hinged. This supporting arm, when not in use, may be swung alongside the rail 2, as indicated in Fig. 1, where, being positioned between the flanges of the rail, it will be out of the way of the operator and at the same time protected from injury.

The operation of the invention may be briefly described as follows. If it is desired to burn in or run in the bearings of a cylinder block, the block is secured upon the table, in the manner already described, the clamps 17 swung up into position and tightened for holding the table in place, and the crank shaft of the block may then be coupled with the power driven shaft so that power may be applied to the crank shaft for burning the bearings in. If desired, the block may be uncoupled from the power shaft and the table swung upwardly until the block rests on the supporting arm 19, which has previously been moved into the position indicated in Fig. 4 for engaging said block and supporting it in upwardly swung position. The block will thus be supported in position for inspection, or the assembling or removal or adjusting of parts, and at the same time it is not necessary to remove the cylinder block from the stand. This saves time and labor which would be otherwise required in the carrying of the block to and from the work bench. Thus parts may be fitted and adjustments made without removing the block from the stand, it being merely necessary, in order to place the block in position for ready adjustment or removal of parts, etc., to swing the table upon which the block is mounted, about on its hinges, until the block is supported by the arm 19. Thus the device serves the double function of a burning in stand for the motor bearings, and a work bench for supporting the cylinder block in assembling and disassembling, or the cleaning or repair of parts.

Although I have described the preferred embodiment of my invention, I may desire to make such changes in the construction, combination and arrangement of parts thereof, as do not depart from the spirit of the invention and the scope of the claims.

I claim:—

1. In a device of the class described, a table for supporting a cylinder block, said table including side members, dowel pins mounted on the side members for engaging openings in the cylinder block for alining the same upon the table, and ears formed on said side members and provided with openings through which fastening means may be engaged with the cylinder block.

2. A motor bearing burning in stand, comprising a base, a table hinged at one side of the base, with means at the other side for clamping it in one position, and means including dowel pins, for insuring the correct position of the table; a shaft bearing structure on the base, in respect to which the table may be swung; and means, including an arm, mounted on the base for extension or depression, to respectively support a motor on the table when raised, or assume an out-of-the-way position against the base.

HENRY VATTER, Jr.